United States Patent
Moinuddin et al.

(10) Patent No.: US 11,349,206 B1
(45) Date of Patent: May 31, 2022

(54) ROBUST LINEARLY CONSTRAINED MINIMUM POWER (LCMP) BEAMFORMER WITH LIMITED SNAPSHOTS

(71) Applicant: KING ABDULAZIZ UNIVERSITY, Jeddah (SA)

(72) Inventors: Muhammad Moinuddin, Jeddah (SA); Ubaid M. Al-Saggaf, Jeddah (SA); Maaz Mahadi, Jeddah (SA); Tarig Ballal Ahmed, Thuwal (SA); Tareq Y. Al-Naffouri, Thuwal (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/387,386

(22) Filed: Jul. 28, 2021

(51) Int. Cl.
*H01Q 3/00* (2006.01)
*H01Q 3/26* (2006.01)

(52) U.S. Cl.
CPC ......... *H01Q 3/2611* (2013.01); *H01Q 3/2605* (2013.01); *H01Q 3/00* (2013.01)

(58) Field of Classification Search
CPC ....... H01Q 3/2611; H01Q 3/2605; H01Q 3/00
USPC .......................................................... 342/372
See application file for complete search history.

(56) References Cited

U.S. PATENT DOCUMENTS

| | | | |
|---|---|---|---|
| 5,600,326 A * | 2/1997 | Yu .......................... | G01S 7/2813 342/149 |
| 6,771,219 B2 * | 8/2004 | Sim ....................... | G06K 9/0057 342/372 |
| 6,798,380 B2 | 9/2004 | Li et al. | |
| 7,352,721 B2 | 4/2008 | Kim et al. | |
| 7,391,386 B2 | 6/2008 | Sawaya et al. | |
| 7,657,038 B2 | 2/2010 | Doclo et al. | |
| 7,830,982 B2 * | 11/2010 | Mesecher .............. | H01Q 1/282 375/299 |
| 8,264,407 B2 * | 9/2012 | Su ........................ | H04B 7/0617 342/373 |
| 8,583,428 B2 | 11/2013 | Tashev et al. | |
| 8,638,260 B2 * | 1/2014 | Su ........................ | H01Q 3/2605 342/372 |
| 8,941,538 B1 * | 1/2015 | Nabar .................. | H04B 7/0617 342/377 |
| 9,301,049 B2 | 3/2016 | Elko et al. | |
| 9,338,551 B2 | 5/2016 | Thyssen et al. | |
| 9,503,818 B2 | 11/2016 | Kordon et al. | |

(Continued)

FOREIGN PATENT DOCUMENTS

| | | | | |
|---|---|---|---|---|
| CN | 113376584 A | * | 9/2021 | ............... G01S 7/02 |
| GB | 2506711 A | | 4/2014 | |
| WO | 2016195813 A2 | | 4/2016 | |

OTHER PUBLICATIONS

E. Ollila and E. Raninen, "Optimal shrinkage covariance matrix estimation under random sampling from elliptical distributions," IEEE Transactions on Signal Processing, vol. 67, No. 10, pp. 2707-2719, 2019.

(Continued)

*Primary Examiner* — Chuong P Nguyen
(74) *Attorney, Agent, or Firm* — WC&F IP

(57) ABSTRACT

Beamformers and beamforming methods are disclosed which involve diagonal loading (regularization). Features may include the automatic determination of the regularization parameter using a linearly constrained minimum power (LCMP) bounded perturbation regularization (BPR) approach.

8 Claims, 7 Drawing Sheets

(56) References Cited

U.S. PATENT DOCUMENTS

| | | | |
|---|---|---|---|
| 9,538,285 | B2 | 1/2017 | Rayala et al. |
| 9,590,707 | B1 * | 3/2017 | Baik ................ H04L 5/006 |
| 9,973,849 | B1 | 5/2018 | Zhang et al. |
| 10,090,898 | B2 * | 10/2018 | Nishimoto ............. H04B 7/04 |
| 10,141,993 | B2 | 11/2018 | Lee et al. |
| 10,297,245 | B1 | 5/2019 | Chen |
| 10,622,715 | B2 | 4/2020 | Athley et al. |
| 2009/0195453 | A1 * | 8/2009 | Kim ................ H04B 7/0417 |
| | | | 342/373 |

OTHER PUBLICATIONS

Y. Sel'en, R. Abrahamsson, and P. Stoica, "Automatic robust adaptive beamforming via ridge regression," Signal Processing, vol. 88, No. 1, pp. 33-49, 2008.

A. E. Hoerl, R. W. Kannard, and K. F. Baldwin, "Ridge regression-:some simulations," Communications in Statistics-Theory and Methods, vol. 4, No. 2, pp. 105-123,1975., Kennard and Baldwin (HKB).

L. Maligranda, "A simple proof of the hölder and the minkowski inequality," The American mathematical monthly, vol. 102, No. 3, pp. 256-259, 1995.

L. Du, J. Li, and P. Stoica, "Fully automatic computation of diagonal loading levels for robust adaptive beamforming," IEEE Transactions on Aerospace and Electronic Systems, vol. 46, No. 1, pp. 449-458, 2010.

Y. Ke, C. Zheng, R. Peng, and X. Li, "Robust adaptive beamforming using noise reduction preprocessing-based fully automatic diagonal loading and steering vector estimation," IEEEAccess, vol. 5, p. 12 974-12 987, 2017.

M. Zhang, X. Chen, and A. Zhang, "A simple tridiagonal loading method for robust adaptive beamforming," Signal Processing, vol. 157, pp. 103-107, 2019.

* cited by examiner

ROBUST LINEARLY CONSTRAINED MINIMUM POWER (LCMP) BEAMFORMER WITH LIMITED SNAPSHOTS

FIELD OF THE INVENTION

The invention generally relates to array processing and, more particularly, beamforming with limited snapshots.

BACKGROUND

Beamforming is a spatial filtering technique that allows receiving desired signals impinging on an array from specific directions while suppressing undesired signals impinging from other directions.

Linearly Constrained Minimum Power (LCMP) beamforming minimizes the total power of the beamformer output such that a set of linear constraints that control the array beam pattern is satisfied. LCMP provides robustness against angle mismatch and perturbation in sensor locations. Practically, the receiver does not have accurate spatial characteristic of a specific scenario. This makes filter designing methods based on assumptions that might not correspond completely to the actual parameters. Several reasons may attribute to this mismatch which include nonstationarity of the environment, multipath, small sample size, steering vector errors, etc. As a result, in the general case, performance of beamformers deteriorate; hence, Robust Adaptive Beamforming (RAB) techniques that mitigate the effect of such mismatches are required. In the literature, a variety of RAB techniques were proposed.

Interference-plus-Noise Covariance (INC) matrix reconstruction methods aim at reducing the effect of the signal of interest by reconstructing the INC. However, the reconstruction process increases the computational complexity.

An alternative RAB technique is the uncertainty set based technique. Methods that involve this technique estimate the signal of interest's steering vector by specifying a spherical uncertainty constraint on the steering vector. However, the performance of these methods is limited to low Signal to Noise Ratio (SNR). In addition, these methods are computationally inefficient since they require solving second-order cone programming problems.

Steering vector projection is another variation of RAB techniques. The steering vector is replaced by its projection on the signal-plus-interference subspace of the sample covariance matrix, which reduces the effect of noise disturbance. Steering vector projection methods perform poorly at low SNRs. Also, they require perfect knowledge of the dimension of the signal-plus-interference subspace.

Diagonal Loading (DL) is a widely used RAB technique in which a constant diagonal matrix is added to the sample covariance matrix. This technique is also known as regularization in the statistical literature. DL's performance depends on the choice of a scalar loading parameter. Choosing the optimal DL automatically is a challenging problem. There is no rigorous way of selecting the parameter since it depends on the noise level, or it is based on a norm constraint of the weight vector. A few methods have been proposed to tackle the problem of automatically choosing the DL parameter. DL methods are efficient if the exact steering vectors of the signal of interest and interference signals are known or small mismatches exist.

The General Linear Combination-based (GLC) method estimates the covariance matrix via a shrinkage method. Its estimation is based on the Minimum Mean Square Errors (MMSE) criterion. However, GLC's performance degrades when the number of sensors is relatively large. A recent covariance matrix estimation technique for data sampled from elliptical symmetric distribution is proposed in E. Ollila and E. Raninen, "Optimal shrinkage covariance matrix estimation under random sampling from elliptical distributions," IEEE Transactions on Signal Processing, vol. 67, no. 10, pp. 2707-2719, 2019. It is also based on the estimation of the optimal shrinkage parameters that minimizes the mean squared error. The work in Y. Sel'en, R. Abrahamsson, and P. Stoica, "Automatic robust adaptive beamforming via ridge regression," Signal Processing, vol. 88, no. 1, pp. 33-49, 2008 considers computing diagonal loading automatically using a method proposed in A. E. Hoerl, R. W. Kennard, and K. F. Baldwin, "Ridge regression: some simulations," Communications in Statistics-Theory and Methods, vol. 4, no. 2, pp. 105-123, 1975. The Horel et al. method computes diagonal loading from the regularized least squares formulation. However, its performance degrades when the number of snapshots is relatively large.

SUMMARY

This disclosure presents a robust linearly constrained minimum power (LCMP) beamformer based on the bounded perturbation regularization approach. To deal with the constraints in the LCMP beamforming problem, the generalized sidelobe canceller of LCMP is used to reformulate the problem to an unconstrained least squares problem. The estimated sample covariance matrix which is included in the linear transformation matrix of the LS problem is normally ill-conditioned which makes using a regularization approach desirable. The regularization parameter is computed using a procedure that combines a constrained equation with a mean squared error criterion. This allows for automatic adjustment of regularization parameter required by the proposed robust beamformer.

Simulation results presented in an Example show that an exemplary linearly constrained minimum power (LCMP) bounded perturbation regularization (BPR) method is effective in scenarios with a ULA of N elements, P constraints, and limited number of snapshots $K \in (N-P, 3N]$.

DETAILED DESCRIPTION

Figure 1:
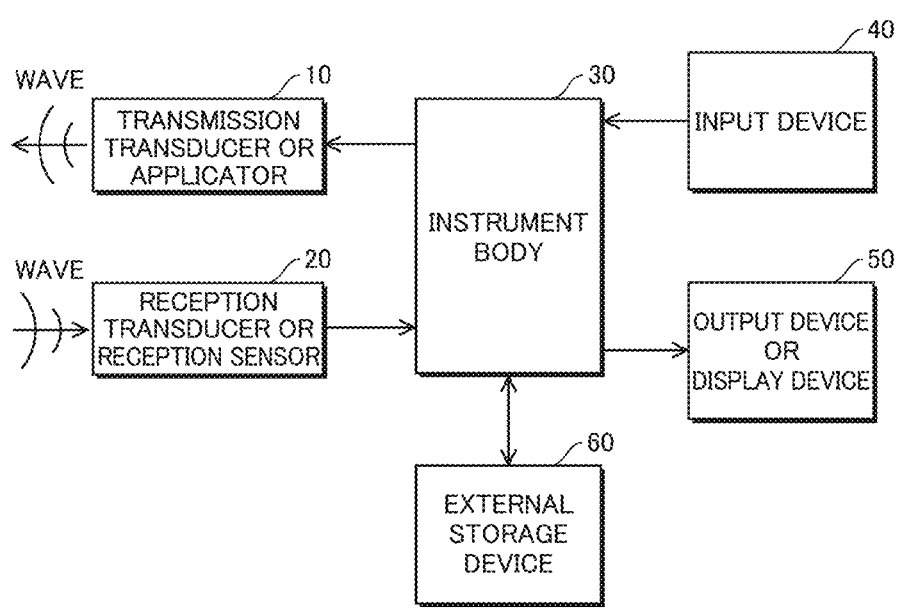
FIG. 1 is a schematic representation (block map) of a measurement and imaging instrument according to an exemplary embodiment.

FIG. 1 shows a schematic representation of an antenna array instrument. The instrument is equipped with a transmission transducer (or an applicator) 10, a reception transducer (or a reception sensor) 20, an instrument body 30, an input device 40, an output device (or a display device) 50, and an external storage (memory) device 60. The transmission transducer 10 and the reception transducer 20 may also be installed into one body or combined to realize a transmission and reception sensor (transceiver). The reception transducer 20 may comprise an array of reception antennas.

Figure 2:
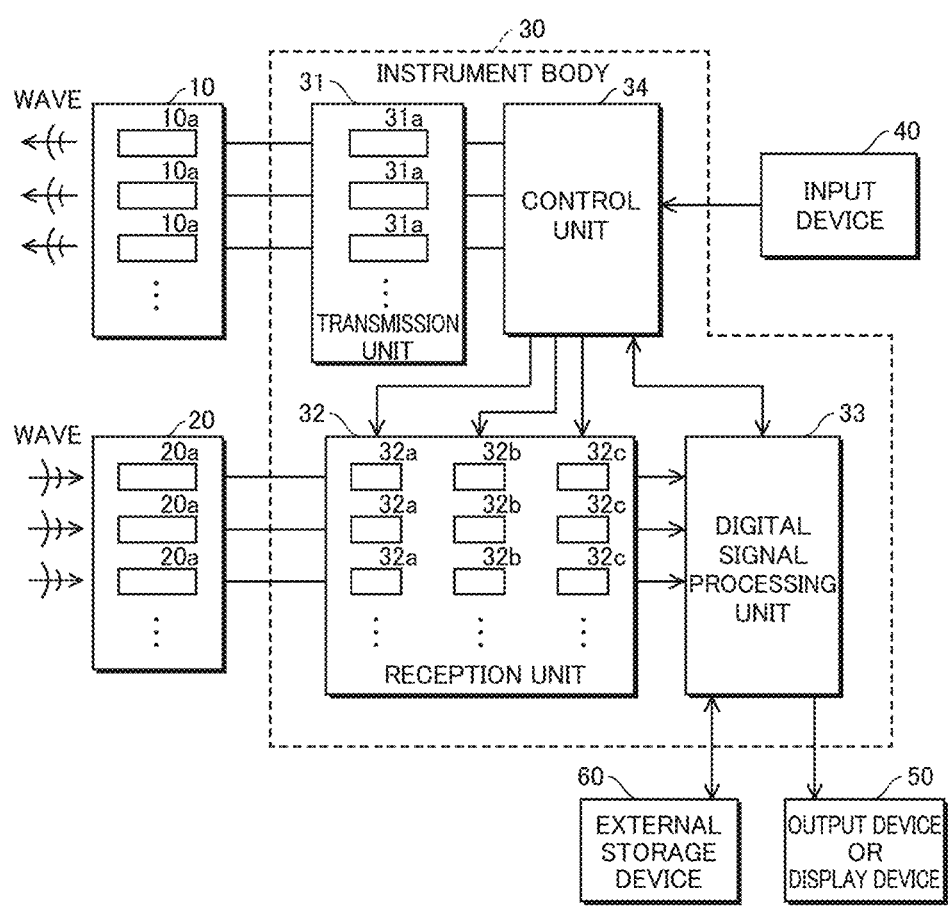
FIG. 2 is another schematic representation (block map) of the instrument shown in FIG. 1.

FIG. 2 shows a schematic representation of internal elements of the instrument of FIG. 1, especially of the instrument body 30. The instrument body 30 may be equipped with a transmission unit 31, a reception unit 32, a digital signal processing (DSP) unit 33, and a control unit 34. The transmission unit 31 and reception unit 32 are configured to respectively generate at least one driving signal and process at least one reception signal to realize a signal processing unit for generating wave data. The DSP unit 33 is configured for e.g. calculating a displacement vector by performing a displacement measurement method for wave signal data generated at at least two different temporal phases. The control unit 34 is configured for controlling the transmission unit 31 and the reception unit 32 for e.g. generating at least one steered wave electrically or mechanically (referred to as "steering beam") and scanning a measurement object in a lateral direction for generating wave signal data at least at the two different temporal phases. In some embodiments, the reception unit 32 may include the DSP unit 33. In FIGS. 1 and 2, communications among the above-mentioned elements or among the units in the instrument body 30 may be performed on the basis of a wire or wireless technology.

The frequencies, bandwidths, wave shapes, and directivities of received signals may be determined by the reception aperture elements 20a of reception transducer 20 and reception unit 32. The reception unit 32 includes receivers 32a with plural channels, AD convertors 32b, and memories (or storage devices, storage media) 32c. Arrival of waves to the reception aperture elements 20a generates the reception signals within the instrument. Reception signal characteristics may be determined by the geometries of the reception aperture elements 20a (thickness or aperture size and shape) and materials. Under the direction of control unit 34, the reception transducer 20 and/or reception unit 32 may perform processing that controls for reception of particular frequencies, bandwidths, wave shapes and directivities of received signals. Desired parameters may be set automatically via the control unit 34 or set using an input device 40.

Control signals (e.g., trigger signals) sent from the control unit 34 in the instrument body 30 may command the start of AD conversions at AD convertors 32b of the respective channels. According to the command signals, analog signals of respective channels are converted to digital signals which are stored in storage devices or storage media 32c. In some embodiments, one frame of received signals may be stored at a time and processed by the DSP unit 33 according to the discussion below. Control unit 34 may also change the transmission aperture position, the transmission effective aperture width, or the transmission steering directions.

Generally, the reception channel number is the number of communication lines that are used for performing one beamforming, to send waves (signals) received by the respective reception aperture elements 20a to the reception unit 32. The formations of reception channels are various. Generally, in order to perform one beamforming every time, received signals generated by plural reception aperture elements 20a are applied with different delays. That is, the reception unit 32 is equipped with analogue or digital delay patterns, and the delay patterns that realize reception focusings or steering directions, etc. can be used according to an operator's selection using the input device 40.

The digital signal processing (DSP) unit 33 is configured to perform beamforming processes with respect to the reception signals generated by transducer 20 and reception unit 32. The DSP unit 33 may also perform other processes such as a Hilbert transform, spectral frequency division, and superposition. The reception unit 32 may include the DSP unit 33, or the DSP unit 33 may include the reception unit 32. The control unit 34 may control the DSP unit 33 and other units by sending command signals. Alternatively, the control unit 34 may include the DSP unit 33, or else the DSP unit 33 may include the control unit 34.

The digital signal processing unit 33 may comprise one or more devices, calculators, PLDs (Programmable Logic Devices), FPGAs (Field-Programmable Gate Arrays), DSPs (Digital Signal Processors), GPUs (Graphical Processing Units), processors, and/or microprocessors.

Following is an explanation of an exemplary procedure and sub-procedures performed by, e.g., an instrument as depicted in FIGS. 1 and 2, particularly by a DSP unit 33.

A. Signal Model and LCMP Beamformer

Assume D narrowband far-field signals are impinging on an array of N elements (N>D). The n th snapshot of signals received by an array is given by $$x(n) = \sum_{i=0}^{D-1} a_i s_i(n) + v(n), \quad (1)$$

where $x(n) \in \mathbb{C}^N$, $a_i$ denotes the steering vector associated with signal i, the subscript i denotes a set of narrowband signals with i=0 (for the desired signal), i=1, 2 ..., D−1 (for interference signals), and $v(n) \in \mathbb{C}^N$ is a vector of Gaussian noise samples.

The output of a narrowband beamformer is obtained by multiplying the signal x(n) with a complex weight w and summing the result to obtain $$y(n) = w^H x(n). \quad (2)$$

For LCMP, these weights are selected to minimize the output power of the beamformer as follows:

$$w_{opt} = \underset{w}{\mathrm{argmin}}\, w^H R_x w \text{ s.t. } C^H w = g, \quad (3)$$

where $R_x = \mathbb{E}[x(n)x^H(n)]$ is the data covariance matrix, $C \in \mathbb{C}^{N \times P}$ is the constraint matrix, and g is a constraint vector with P elements. The optimum solution is given by $$w_{opt} = R_x^{-1} C (C^H R_x^{-1} C)^{-1} g. \quad (4)$$

Practically, the true covariance matrix is unknown; thus, it is usually replaced by the sample covariance matrix $$\hat{R}_x = \frac{1}{K} \sum_{n=1}^{K} x(n) x^H(n), \quad (5)$$

where K is the number of snapshots. The estimated weights of the LCMP beamformer using equation (5) are given by $$w_{lcmp} = \hat{R}_x^{-1} C (C^H \hat{R}_x^{-1} C)^{-1} g. \quad (6)$$

B. Generalized Sidelobe Canceller

The optimization equation (3) can be formulated differently by decomposing w into two components: The first one is in the constraint subspace, and the second one is orthogonal to the first, i.e., $$w = w_q - B w_a, \quad (7)$$

where $w_q \in \mathbb{C}^N$ is a fixed quiescent weight vector calculated as $$w_q = C(C^H C)^{-1} g, \quad (8)$$

and $B \in \mathbb{C}^{N \times (N-P)}$ is a blocking matrix which is orthogonal to $C(B^H C = [0]_{N-P \times P})$. The blocking matrix is not unique. It is chosen such that $B^H B = I$ which can be calculated as the eigenvectors corresponding to the $N-P$ non-zero eigenvalues of $I - C(C^H C)^{-1} C^H$.

By substituting equation (7) into equation (3) and replacing $R_x$ with $\hat{R}_x$, the problem can be reformulated as the following unconstrained LS:

$$\min_{w_a} (Bw_a - w_q)^H \hat{R}_x (Bw_a - w_q), \quad (9)$$

or $$\min_{w_a} \|Aw_a - b\|^2, \quad (10)$$

where $$A \triangleq \hat{R}_x^{\frac{1}{2}} B \in \mathbb{C}^{N \times N-P}$$

and $$b \triangleq \hat{R}_x^{\frac{1}{2}} w_q.$$

The above minimization corresponds to the following linear regression model:

$$b = A w_a + z, \quad (11)$$

where $z \in \mathbb{C}^N$ is a residual error vector. Since $$\hat{R}_x^{\frac{1}{2}}$$

is normally ill-conditioned, and b is noisy, the application of regularization to estimate $w_a$ is desirable. The Regularized Least Squares (RLS) problem is stated as follows:

$$\min_{w_a} \|Aw_a - b\|^2 + \gamma \|w_a\|^2, \quad (12)$$

which has the closed-form solution $$\hat{w}_a = (A^H A + \gamma I)^{-1} A^H b. \quad (13)$$

As can be seen from equation (13), this approach regularizes $A^H A$, which is of dimension $(N-P) \times (N-P)$ instead of $\hat{R}_x$ which is of an $N \times N$ dimension. Hence, the inversion equation (13) is valid for fewer snapshots.

C. The MSE of the RLS Estimator

The Mean-Squared Error criterion (MSE) for the RLS is defined as $$MSE = tr[\mathbb{E}[(\hat{w}_a - w_a)(\hat{w}_a - w_a)^H]], \quad (14)$$

where tr (.) denotes the matrix trace. The Singular Value Decomposition (SVD) of A is $$A = U \Sigma V^H, \quad (15)$$

where $$U \in \mathbb{C}^{N \times N}, \quad \sum = \mathrm{diag}\left[\sigma_1, \sigma_2, \ldots \sigma_{N-P}, \underbrace{0, \ldots 0}_{P \text{ zeros}}\right]^T,$$

with $\sigma_1 > \sigma_2 > \ldots > \sigma_{N-P}$, and $V \in \mathbb{C}^{N-P \times N}$.

Substituting Equation (15) into equation (11), substituting the result in equation (13), and substituting the final result in equation (14) and manipulating, gives a result of $$MSE = \sigma_z^2 tr\left[\sum\left(\sum^2 + \gamma I\right)^{-2}\right] + \gamma^2 tr\left[\left(\sum^2 + \gamma I\right)^{-2} V^H R_{w_a} V\right], \quad (16)$$

where $\sigma_z^2$ is the noise variance, and $R_{w_a} \triangleq \mathbb{E}[w_a w_a^H]$. The derivative of equation (16) with respect to $\gamma$ is taken and a critical point is obtained by solving $$MSE' = \quad (17)$$

$$-2\sigma_z^2 tr\left[\sum\left(\sum^2 + \gamma I\right)^{-3}\right] + 2\gamma tr\left[\sum\left(\sum^2 + \gamma I\right)^{-3} V^H R_{w_a} V\right] = 0.$$

However, a closed-form solution cannot be produced from equation (17). An approximated formula can be written as follows:

$$MSE' \approx \quad (18)$$

$$-2\sigma_z^2 tr\left[\sum\left(\sum^2 + \gamma I\right)^{-3}\right] + 2\gamma \frac{tr(R_{w_a})}{N} tr\left[\sum\left(\sum^2 + \gamma I\right)^{-3}\right] = 0.$$

Solving for $\gamma$ obtains the approximate minimizer of the MSE in equation (16). That is $$\gamma_o \approx \frac{N \sigma_z^2}{tr(R_{w_a})}. \quad (19)$$

However, optimal $\gamma$ depends on unknown statistics of the signal. The following section describes an exemplary method to obtain $\gamma$ directly from the observed signals.

D. The Bounded Perturbation Regularization (BPR) Approach

An exemplary model that is used for estimating a vector quantity $w_a \in \mathbb{C}^N$ is $$b \approx (A + \Delta) w_a + z, \quad (20)$$

where $\Delta \in \mathbb{C}^{N \times N-P}$ is a perturbation matrix. The aim of this perturbation is to modify the singular values of A in a way that helps improve the estimation of the vector $w_a$. The perturbation matrix $\Delta$ is chosen such that:

$$\|\Delta\|_2 \leq \zeta, \quad (21)$$

where $\zeta$ is an unknown constant. The problem formulation for estimating $w_a$ can be written as a min-max optimization problem $$\min_{\hat{w}_a} \max_{\Delta} \|b - (A+\Delta)\hat{w}_a\|_2 \text{ subject to } \|\Delta\|_2 \leq \zeta, \quad (22)$$

that is, seeking an estimate of $w_a$ that minimizes the maximum residual error over all possible bounded perturbations $\Delta$.

Using Minkowski's inequality (described in e.g. L. Maligranda, "A simple proof of the hölder and the minkowski inequality," The American mathematical monthly, vol. 102, no. 3, pp. 256-259, 1995) and manipulating, the problem is reformulated as the following equivalent minimization problem:

$$\min_{\hat{w}_a} \|b - A\hat{w}_a\|_2 + \zeta \|\hat{w}_a\|_2, \quad (23)$$

which has a solution given by equation (13) with the following constraint:

$$\gamma = \frac{\zeta \|b - A\hat{w}_a\|_2}{\|\hat{w}_a\|_2}, \quad (24)$$

where $\gamma$ is the unknown regularization parameter. Substituting equation (24) into equation (13) and manipulating results in the following equation:

$$f_1(\gamma) = \gamma^2 b^H A (A^H A + \gamma I)^{-2} A^H b - \quad (25)$$
$$\zeta^2 [b^H b - b^H A (A^H A + \gamma I)^{-1} A^H b - \gamma b^H A (A^H A + \gamma I)^{-2} A^H b] = 0.$$

Applying the SVD equation (25) and manipulating gives the result $$f_2(\gamma) = b^H U (\Sigma^2 - \zeta^2 I)(\Sigma^2 + \gamma I)^{-2} U^H b = 0. \quad (26)$$

Equation (26) can be used to find $\gamma$. However, it requires knowing the value of $\zeta$. To remove dependency on $\zeta$, seek an optimal value, $\zeta_o$, that satisfies equation (26) on average, i.e., $$\mathbb{E}[b^H U(\Sigma^2 - \zeta_o^2)(\Sigma^2 + \gamma_o I)^{-2} U^H b] = 0. \quad (27)$$

Solving for $\zeta_o^2$ and manipulating results in $$\zeta_o^2 = \frac{tr\left[\sum^2 \left(\sum^2 + \gamma_o I\right)^{-2} U^H R_b U\right]}{tr\left[\sum^2 \left(\sum^2 + \gamma_o I\right)^{-2} U^H R_b U\right]}, \quad (28)$$

where $R_b = \mathbb{E}[bb^H] = U\Sigma V^H R_{w_a} V\Sigma U^H + \sigma_z^2 I_n$. Substituting for $R_b$ in equation (28) yields $$\zeta_o^2 = \frac{\sigma_z^2 tr\left[\sum^2 \left(\sum^2 + \gamma_o I\right)^{-2}\right] + tr\left[\sum^4 \left(\sum^2 + \gamma_o I\right)^{-2} V^H R_{w_a} V\right]}{\sigma_z^2 tr\left[\sum^2 \left(\sum^2 + \gamma_o I\right)^{-2}\right] + tr\left[\sum^2 \left(\sum^2 + \gamma_o I\right)^{-2} V^H R_{w_a} V\right]}. \quad (29)$$

Applying a similar approximation to that used in equation (18) gives the result $$\zeta_o^2 \approx \frac{\sigma_z^2 tr\left[\sum^2 \left(\sum^2 + \gamma_o I\right)^{-2}\right] + \frac{tr(R_{w_a})}{N} tr\left[\sum^2 \left(\sum^2 + \gamma_o I\right)^{-2}\right]}{\sigma_z^2 tr\left[\sum^2 \left(\sum^2 + \gamma_o I\right)^{-2}\right] + \frac{tr(R_{w_a})}{N} tr\left[\sum^2 \left(\sum^2 + \gamma_o I\right)^{-2}\right]}, \quad (30)$$

which can be written as $$\zeta_o^2 = \frac{tr\left[\sum^2 \left(\sum^2 + \gamma_o I\right)^{-1}\right]}{tr\left[\left(\sum^2 + \gamma_o I\right)^{-1}\right]}. \quad (31)$$

Finally, substituting equation (31) into equation (26) and replacing $\gamma_o$ with $\gamma$ and manipulating yields $$f_3(\gamma) = tr\left[\left(\sum^2 + \gamma I\right)^{-1}\right] tr\left[\left(\sum^2 + \gamma I\right)^{-1} dd^H\right] - N\left[\left(\sum^2 + \gamma I\right)^{-2} dd^H\right] = 0 \quad (32)$$

where $d \triangleq U^H b$. Equation (32) is the BPR equation which is solvable using Newton's or any other suitable method.

Finally, substitute the regularization parameter, $\gamma$, obtained from equation (32) in the loaded version of equation (6), to obtain the following:

$$w_{DL} = (\hat{R}_x + \gamma I)^{-1} C (C^H (\hat{R}_x + \gamma I)^{-1} C)^{-1} g. \quad (33)$$

EXAMPLE

To evaluate performance, the output signal-to-interference-and-noise-ratio (SINR) is considered. Equation (1) can be written as $x(n) = x_s(n) + x_{iv}(n)$, where $x_s(n) \triangleq a_0 s_0(n)$ and $x_{iv}(n) \triangleq \sum_{i=1}^{D-1} a_i s_i(n) + v(n)$. The output SINR is defined as follows:

$$SINR = \frac{\mathbb{E}[|w^H x_s(n)|^2]}{\mathbb{E}[|w^H x_{iv}(n)|^2]} \quad (34)$$

$$= \frac{\sigma_s^2 |w^H a_{0t}|^2}{w^H R_{i+n} w}, \quad (35)$$

where $R_{i+n} = \mathbb{E}[x_{iv}(n) x_{iv}^H(n)]$ is the INC matrix, $\sigma_s^2$ is the power of the signal of interest, and $a_{0t}$ is the actual steering vector of the desired signal.

All scenarios in this Example compare the exemplary LCMP-BPR procedure of this disclosure with HKB, elliptical regularized sample covariance matrix (ELL-RSCM), GLC, multichannel wiener filtering based noise reduction with truncated minimum mean square error criterion (MWF-TMMSE), and tridiagonal loading (TRI) methods. HKB is disclosed in Y. Sel'en, R. Abrahamsson, and P. Stoica, "Automatic robust adaptive beamforming via ridge regression," Signal Processing, vol. 88, no. 1, pp. 33-49, 2008 and A. E. Hoerl, R. W. Kannard, and K. F. Baldwin, "Ridge regression: some simulations," Communications in Statistics-Theory and Methods, vol. 4, no. 2, pp. 105-123, 1975. ELL-RSCM is disclosed in E. Ollila and E. Raninen, "Optimal shrinkage covariance matrix estimation under random sampling from elliptical distributions," IEEE Transactions on Signal Processing, vol. 67, no. 10, pp. 2707-2719, 2019. GLC is disclosed in L. Du, J. Li, and P. Stoica, "Fully automatic computation of diagonal loading levels for robust adaptive beamforming," IEEE Transactions on Aerospace and Electronic Systems, vol. 46, no. 1, pp. 449-458, 2010. MWF-TMMSE is disclosed in Y. Ke, C. Zheng, R. Peng, and X. Li, "Robust adaptive beamforming using noise reduction preprocessing-based fully automatic diagonal loading and steering vector estimation," IEEEAccess, vol. 5, pp. 12 974-12 987, 2017. TRI is disclosed in M. Zhang, X. Chen, and A. Zhang, "A simple tridiagonal loading method for robust adaptive beamforming," Signal Processing, vol. 157, pp. 103-107, 2019.

Similar to the exemplary method of this disclosure, HKB and TRI methods are one parameter diagonal loading methods. The other methods, ELL-RSCP, GLC and MWF-TMMSE, estimate the covariance matrix via a shrinkage method that uses two regularization parameters.

A uniform linear array (ULA) of N=10 elements with d=0.5λ between consecutive elements is used in all simulations of this Example, where λ is the wavelength. Uncertainty in the direction of arrival (DOA) of the signal of interest is modeled as a uniform distribution in the range [−2°, 2°]. Six interference signals (D=6) are impinging on the array.

The signal of interest and interference signals are complex Gaussian data generated randomly with SNR=5 dB and Interference-to-Noise Ratio (INR=20 dB). The noise is complex white Gaussian with unit-norm power. Source locations are randomly chosen in every iteration. All SINR curves are obtained by averaging over $2 \times 10^4$ independent trials. For this LCMP beamformer, three signals out of the six interference signals are constrained to nulls, i.e., the constraint vector is $g=[1,0,0,0]^T$ (P=4).

Figure 3A:
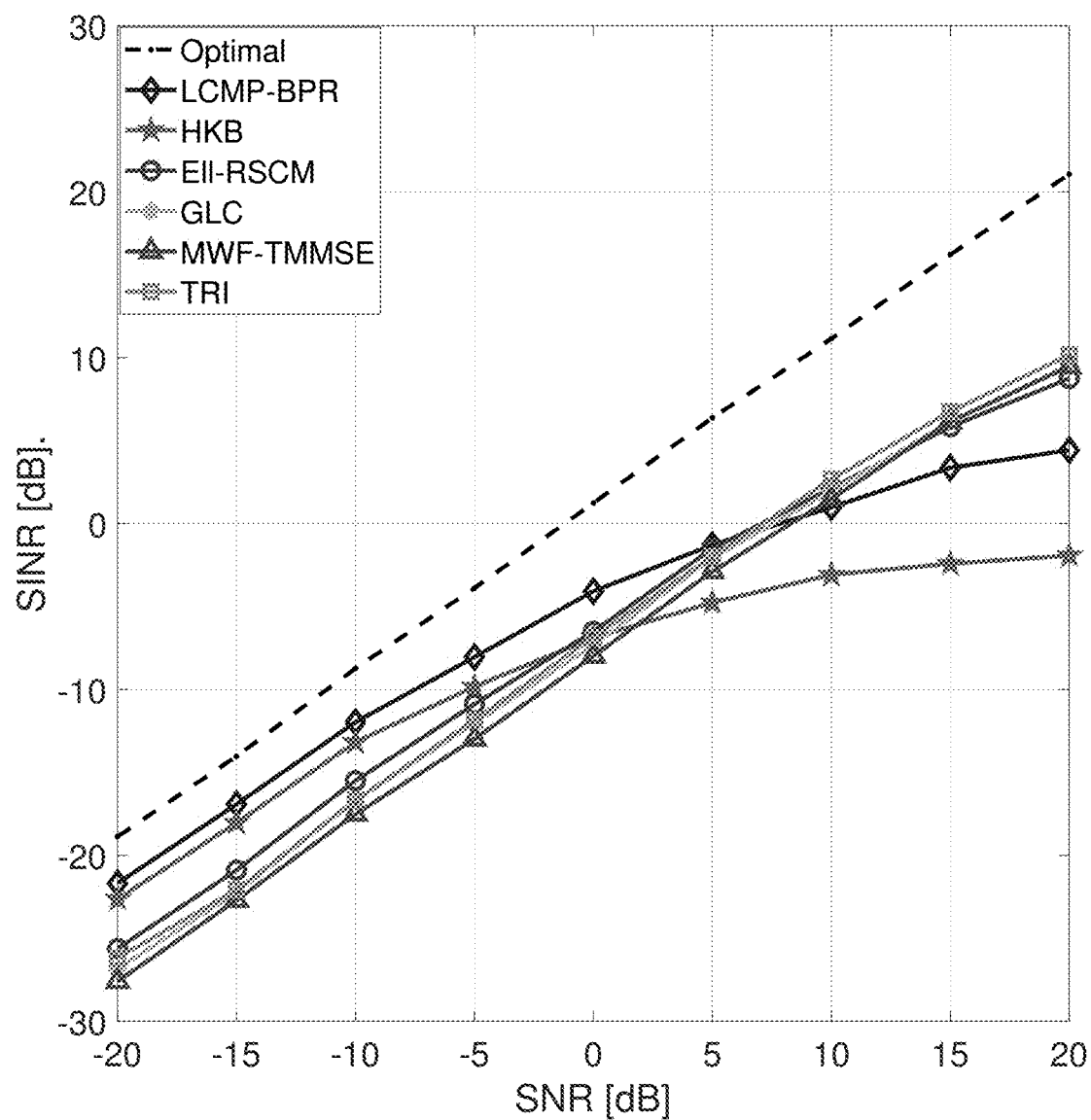
FIG. 3A shows the output signal-to-interference-and-noise-ratio (SINR) versus signal-to-noise-ratio (SNR) performance (K=7).

FIG. 3A shows the output SINR versus SNR. As can be seen from the figure, for SNR≤10 dB, the exemplary LCMP-BPR method of this disclosure achieves the best performance among all the methods. For 10 dB<SNR≤20 dB, LCMP-BPR exhibits an inferior performance compared to the other methods except HKB.

Figure 3B:
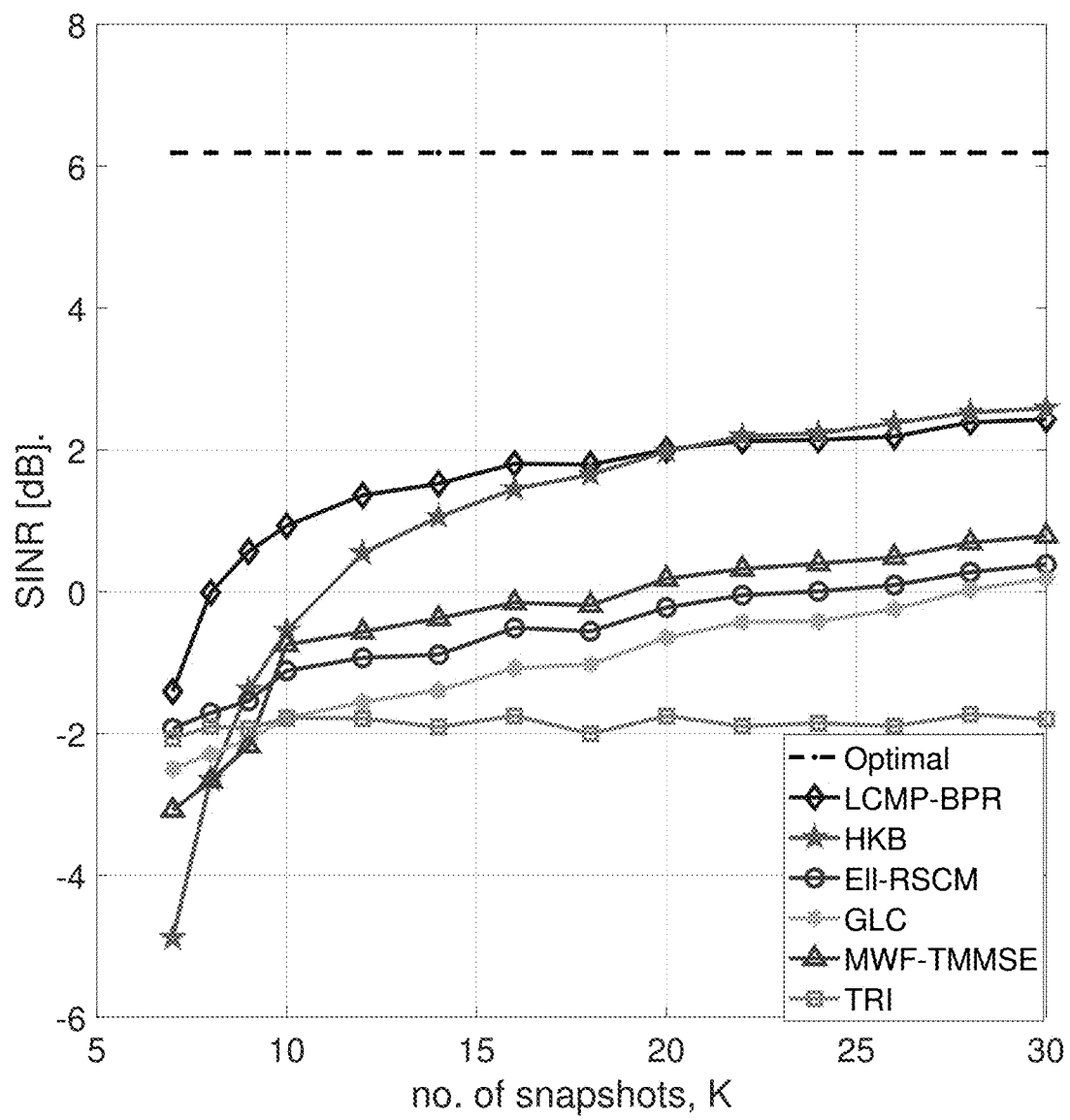
FIG. 3B shows the output SINR versus the number of snapshots, K (SNR=5 dB).

FIG. 3B shows the output SINR versus the number of snapshots, K. As can be seen, when N−P<K<2N, LCMP-BPR outperforms all the other techniques. However, for 2N≤K≤3N, HKB shows a slight advantage over LCMP-BPR.

Figure 4A:
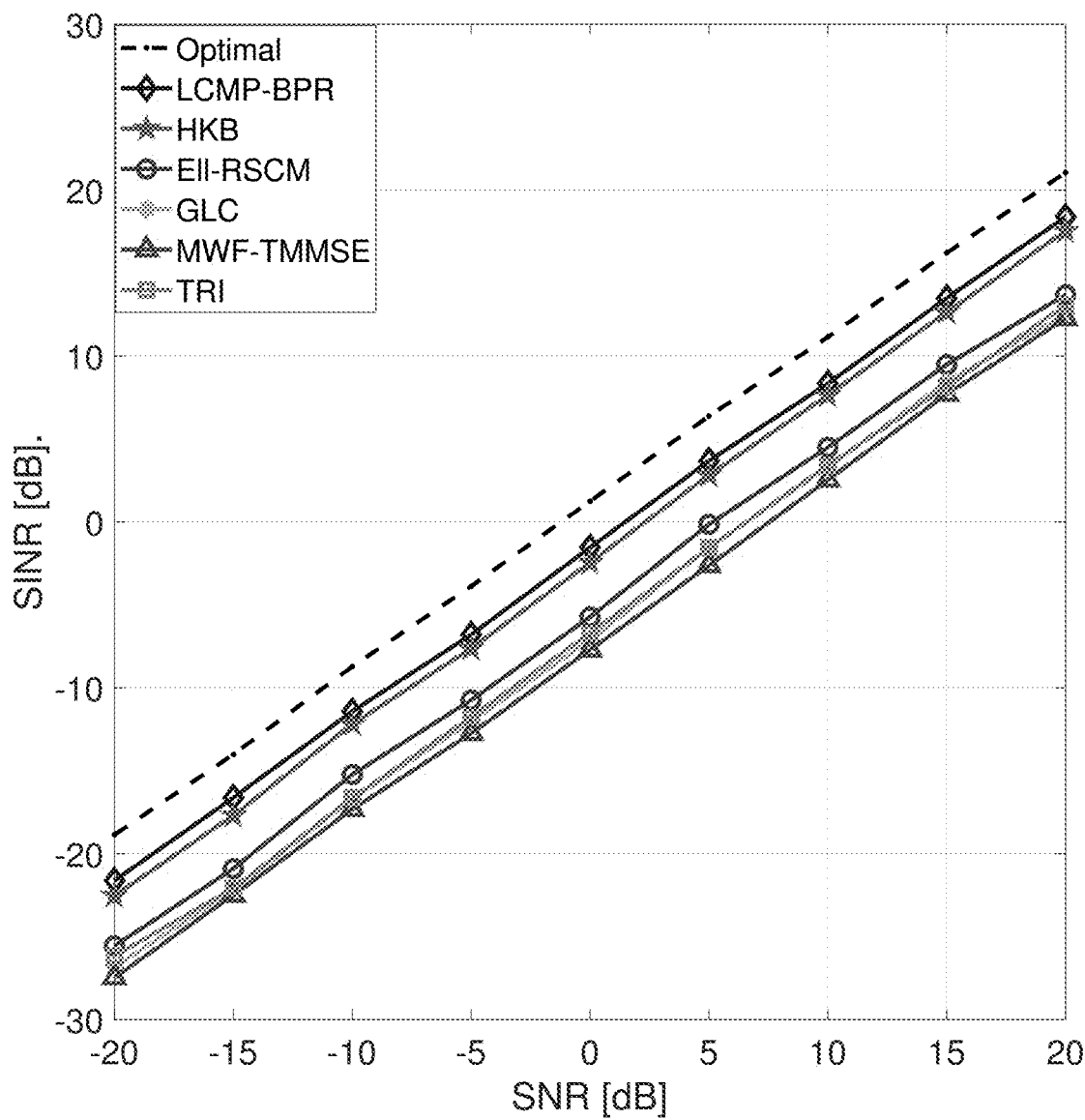
FIG. 4A shows the output SINR versus SNR performance for Interference-plus-Noise Covariance (INC) estimated using equation (36) (K=7).
Figure 4B:
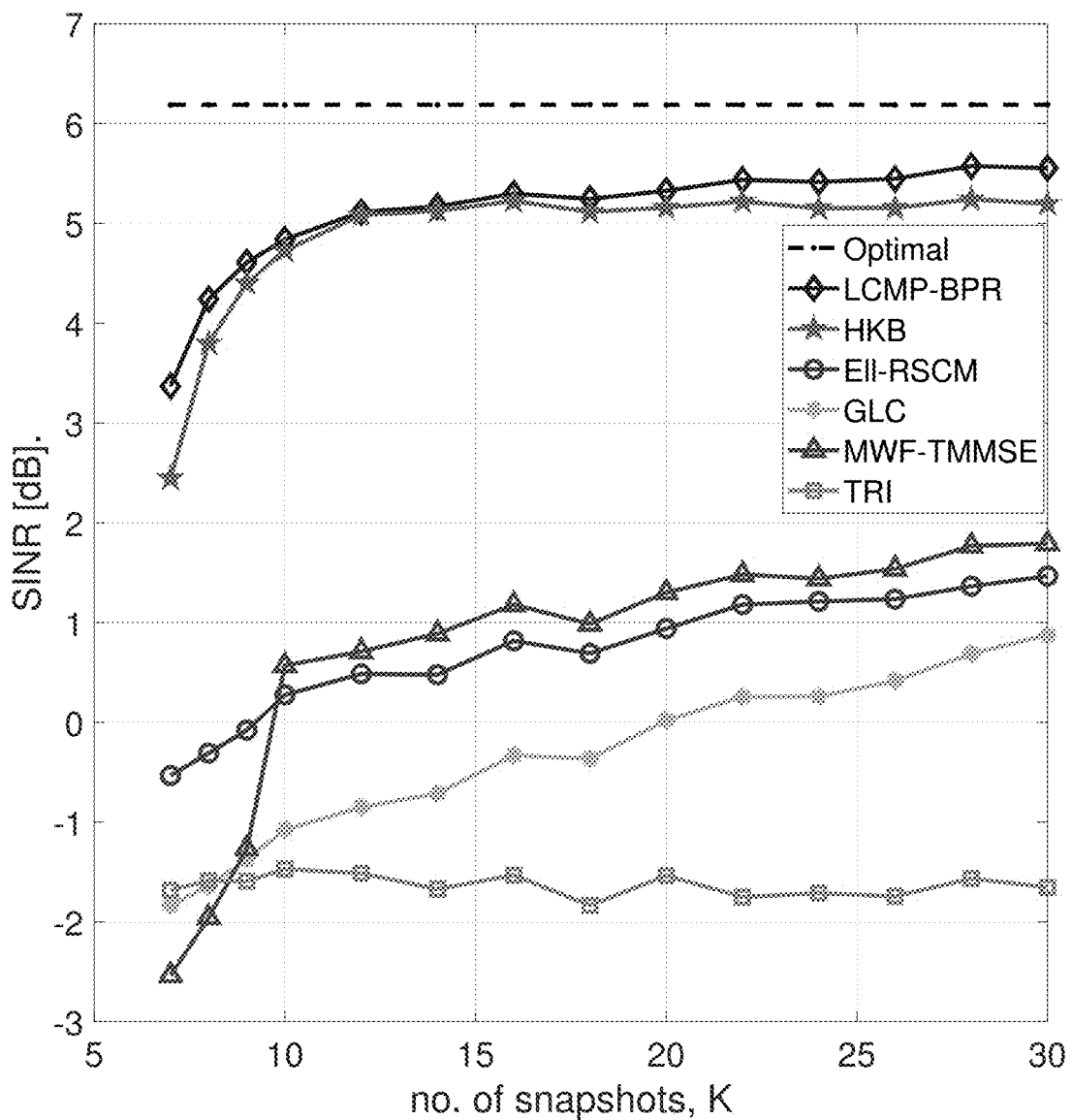
FIG. 4B shows the performance of SINR versus the number of snapshots K with INC estimated using equation (36) (SNR=5 dB).

The performance of the exemplary LCMP-BPR method of this disclosure is highly sensitive to the effect of the desired signal in the estimated INC. This explains the good performance of the method at low SNRs. To elaborate, consider estimating the INC matrix from the noise and interference samples generated in the simulation, i.e., $$\hat{R}_{i+n} = \frac{1}{K} \sum_{N=1}^{K} x_{iv}(n) x_{iv}^H(n), \quad (36)$$

and use it instead of $\hat{R}_x$. FIG. 4A illustrates the output SINR versus SNR performance for INC estimated using equation (36). It is clear that the exemplary method outperforms all the alternative methods over the entire SNR range. Similarly, FIG. 4B shows the performance of SINR versus the number of snapshots with enhanced estimation of INC. It is evident that both LCMP-BPR and HKB outperform the other methods with a good margin. The superiority of LCMP-BPR is more emphasized for N−P<K≤3N.

Figure 5:
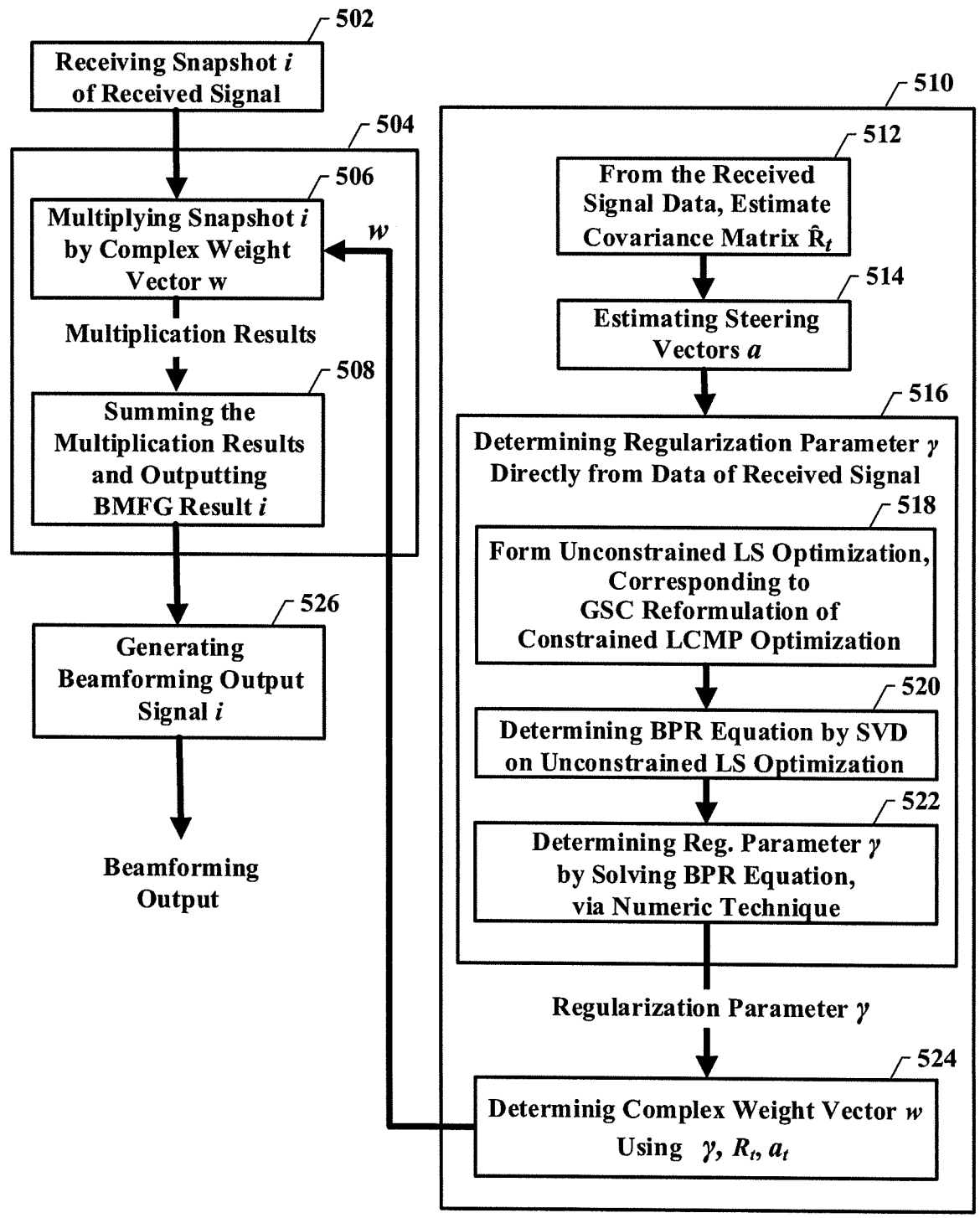
FIG. 5 shows a block diagram of example operations in an improved SINR beamforming process in accordance with this disclosure.

FIG. 5 shows a block diagram of example steps in an improved SINR beamforming process in accordance with this disclosure. Example steps include receiving 502 by a DSP, e.g., DSP unit 33, from an antenna array, e.g., transducers 20, snapshots x(n) of a received signal that can comprise, as described above, a desired signal and undesired signals, and performing by the DSP a beamforming 504 for each snapshot x(n). Beamforming 504 steps can comprise multiplying 506 the snapshot x(n) with a complex weight w vector, obtaining a plurality of multiplication results, summing the results and outputting 508 said sum as a beamforming result. Features include automatically determining 510, by the DSP unit, the complex weight w vector. Steps in the automatic determining 510 can include determining 512 the covariance matrix $\hat{R}_x$ and estimating 514 steering vectors $a_t$ of the desired signal and the undesired signals. Steps in automatically determining 510 the w vector include determining 516 a regularization parameter γ, directly from data of the received signal as described above. Determining 516 can include forming 518 an unconstrained least-squares (LS) optimization problem. The forming 518, as described above referring to equations (9) (13), corresponds to a GSC reformulation of a constrained LCMP optimization problem. Steps in automatic determining 510 the w vectors also include determining 520 a bounded perturbation regularization (BPR) equation by steps comprising a singular value decomposition (SVD) on the unconstrained LS optimization problem, and determining γ by solving 522 the BPR equation, via steps that include using a numeric technique. The process then proceeds to determining 524 the complex weight w based on a combination of the regularization parameter γ, $\hat{R}_x$, a constraint matrix C, and a constraint vector g. As described above, complex weight w can be for diagonal loading. The process then proceeds to generating and outputting 526 a beamforming signal based on the beamforming result at 508.

Some embodiments of the present invention may be a system, a device, a method, and/or a computer program product. A system, device, or computer program product may include a computer readable storage medium (or media) having computer readable program instructions thereon for causing one or more processors to carry out aspects of the present invention, e.g., processes or parts of processes or a combination of processes described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Processes described herein, or steps thereof, may be embodied in computer readable program instructions which may be paired with or downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions and in various combinations.

These computer readable program instructions may be provided to one or more processors of one or more general purpose computers, special purpose computers, or other programmable data processing apparatuses to produce a machine or system, such that the instructions, which execute via the processor(s) of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A beamforming method for improved signal-to-interference-and-noise-ratio (SINR) beamforming output and requiring fewer snapshots, comprising
    receiving by a digital signal processor, from an antenna array, snapshots of received signal, wherein the nth snapshot is x(n), wherein the received signal includes a composite of a desired signal and undesired signals; and
    performing by the digital signal processor a beamforming for each snapshot x(n), the beamforming comprising:
        multiplying the snapshot x(n) with a complex weight w vector to obtain a plurality of multiplication results, and
        outputting, as a beamforming result, a sum of the multiplication results of the multiplying step; and
    automatically determining, by the digital signal processing unit, the complex weight w vector by a process comprising the following steps:
        determining a sample covariance matrix $\hat{R}_x$ from data of the received signal,
        estimating steering vectors $a_i$ of the desired signal and the undesired signals,
        determining a regularization parameter γ directly from data of the signal, by steps including:

forming an unconstrained least-squares (LS) optimization problem, corresponding to a generalized sidelobe canceller (GSC) reformulation of a constrained LCMP optimization problem, determining a bounded perturbation regularization (BPR) equation by steps that include performing a singular value decomposition (SVD) on the unconstrained LS optimization problem, and determining the regularization parameter γ by solving the BPR equation, via steps that include using a numeric technique, and determining the complex weight w based on a combination of the regularization parameter γ, the covariance matrix $\hat{R}_x$, a constraint matrix C, and a constraint vector g, the complex weight w being for diagonal loading; and generating, based on the beamforming result, beamforming signal output.

2. The beamforming method of claim 1, further comprising:

estimating the interference-plus-noise covariance matrix (INC); and determining the complex weight vector w using the estimated INC as the covariance matrix $\hat{R}_x$.

3. The beamforming method of claim 1, wherein the steps that include the numeric technique include steps using Newton's method.

4. The beamforming method of claim 1, wherein the step of determining the covariance matrix $\hat{R}_x$ is configured to use K snapshots and to determine matrix $\hat{R}_x$ as $$\hat{R}_x = \frac{1}{K}\sum_{N=1}^{K} x(n)x^H(n).$$

5. A beamforming instrument for improved signal-to-noise ratio beamforming output and requiring fewer snapshots, comprising an antenna array for receiving snapshots of received signal, wherein the nth snapshot is x(n), wherein the received signal is a composite of a desired signal and undesired signals; and a digital signal processing unit configured for performing a beamforming for each snapshot x(n), the beamforming comprising:

multiplying each snapshot x(n) with a complex weight w vector to obtain a plurality of multiplication results, and outputting, as a beamforming result, a sum of the multiplication results of the multiplying step;

the digital signal processing unit further configured for automatically determining the complex weight w vector by a process comprising the following steps:

determining a sample covariance matrix $\hat{R}_x$ from data of the received signal, estimating steering vectors $a_i$ of the desired signal and the undesired signals, determining a regularization parameter γ directly from data of the signal, by steps including:

forming an unconstrained least-squares (LS) optimization problem, corresponding to a generalized sidelobe canceller (GSC) reformulation of a constrained LCMP optimization problem, determining a bounded perturbation regularization (BPR) equation by steps that include performing a singular value decomposition (SVD) on the unconstrained LS optimization, determining the regularization parameter γ by solving the BPR equation, via steps that include using a numeric technique, determining the complex weight w based on a combination of the regularization parameter γ, the covariance matrix $\hat{R}_x$, a constraint matrix C, and a constraint vector g, the complex weight w being for diagonal loading; and a signal output for outputting a beamforming signal output that is based on the beamforming result.

6. The beamforming instrument of claim 5, further comprising the digital signal processing unit being further configured to perform an estimating the interference-plus-noise covariance matrix (INC).

7. The beamforming instrument of claim 5, further comprising the digital signal processing unit being further configured to perform the numeric technique using Newton's method.

8. The beamforming instrument of claim 5, further comprising the digital signal processing unit being further configured to determine the sample covariance matrix $\hat{R}_x$ using K snapshots and to determine $\hat{R}_x$ as $$\hat{R}_x = \frac{1}{K}\sum_{N=1}^{K} x(n)x^H(n).$$

* * * * *